(12) United States Patent
Howell

(10) Patent No.: US 7,367,400 B1
(45) Date of Patent: May 6, 2008

(54) MOTOR PROTECTOR AND METHOD FOR CHEMICAL PROTECTION OF SAME

(75) Inventor: Alan Howell, Edmond, OK (US)

(73) Assignee: Wood Group ESP, Inc., Oklahoma City, OK (US)

( * ) Notice: Subject to any disclaimer, the term of this patent is extended or adjusted under 35 U.S.C. 154(b) by 316 days.

(21) Appl. No.: 10/940,887

(22) Filed: Sep. 13, 2004

(51) Int. Cl.
*E21B 43/00* (2006.01)

(52) U.S. Cl. ............ 166/310; 166/66.4; 166/105.4; 166/369; 310/87; 417/414

(58) Field of Classification Search ............. 166/66.4, 166/105.1, 369, 104, 304, 242.4, 250.05; 310/87; 417/414, 423.3
See application file for complete search history.

(56) References Cited

U.S. PATENT DOCUMENTS

| 4,421,999 A | | 12/1983 | Beavers et al. |
| 4,684,837 A | | 8/1987 | Schaefer et al. |
| 4,837,068 A | * | 6/1989 | Martin et al. ............. 428/133 |
| 4,992,689 A | | 2/1991 | Bookout |
| 5,367,214 A | | 11/1994 | Turner, Jr. |
| 5,622,222 A | * | 4/1997 | Wilson et al. ............ 166/105.4 |
| 5,796,197 A | | 8/1998 | Bookout |
| 5,898,245 A | | 4/1999 | Cochimin |
| 6,046,521 A | * | 4/2000 | Heinig .................. 310/87 |
| 6,100,616 A | * | 8/2000 | Heinig et al. ............. 310/87 |
| 6,201,327 B1 | | 3/2001 | Rivas |
| 6,268,672 B1 | | 7/2001 | Straub et al. |
| 6,307,290 B1 | | 10/2001 | Scarsdale |
| 6,602,059 B1 | | 8/2003 | Howell et al. |
| 6,666,269 B1 | | 12/2003 | Bangash et al. |
| 6,684,956 B1 | | 2/2004 | Berry |

OTHER PUBLICATIONS

U.S. Appl. No. 10/430,781, filed May 6, 2003, Yasser Bangash, et al., titled Expansion Chamber for Submersible Pump Assembly.
Parco, Inc., "Elastomer Selection Guide," 1999.
"Oil and Gas Industry Seals and Sealing—Success and Failure," by Daniel L. Hertz, Jr., Seals Eastern, Inc., Red Bank, New Jersey, presented at ERG Fall Technical Meeting, Houston, Texas, Sep. 18, 1996.
"Sour Hydrocarbons—The Elastomer Challenge," by D. L. Hertz, Jr., Seals Eastern, Inc., Red Bank, New Jersey, presented at a meeting of the Rubber Division, American Chemical Society, Las Vegas, Nevada, May 20-23, 1980.
"A Mechanistic Study of $CO_2$ Corrosion of Mild Steel in the presence of $H_2S$," by Kun-Lin John Lee, at http://oak.cats.ohiou.edu/~k1217202/phdproposal.html (visited Aug. 2, 2004).
Prior Art Drawings 1-5.

* cited by examiner

*Primary Examiner*—Jennifer Gay
*Assistant Examiner*—Robert E Fuller
(74) *Attorney, Agent, or Firm*—McAfee & Taft

(57) ABSTRACT

A chamber for use in a submersible pump assembly. The submersible pump assembly has a submersible motor which is connected to a power source and which will drive a submersible pump in the submersible pump assembly. A motor protector with expansion chamber is connected to the submersible motor. The expansion chamber and submersible motor are filled with motor oil. The expansion chamber has a housing and a reactant disposed in the housing interior for reacting with and reducing the concentration of contaminants present in the well fluid that are harmful to components of the motor protector.

34 Claims, 3 Drawing Sheets

MOTOR PROTECTOR AND METHOD FOR CHEMICAL PROTECTION OF SAME

BACKGROUND OF THE INVENTION

This invention relates to a motor protector for oil-filled submersible electric motors and, more particularly, to a motor protector having a prolonged operational life and increased resistance to chemical attack.

A variety of fluids is pumped from subterranean zones with a variety of different types of pumps. In the production of petroleum, it is common to employ electric submersible systems for lifting the fluids collected in the well. Such systems generally include a submersible pump and a submersible oil-filled electric motor separated by a seal or protector assembly. The seal or protector functions, in part, to provide a reservoir of motor fluid in communication with the electric motor, to allow for thermal expansion and contraction of the motor fluid, and to keep the well fluid out of the motor. Well fluid generally comprises salt water, particulate solids and other contaminants that are deleterious to the motor.

There are two types of motor protectors commonly used in the field. One type is referred to as a bladder or bag protector. The bladder, positioned within the protector assembly housing, provides a positive barrier between the well fluid outside the bladder and the motor fluid within. It is made of an elastomeric material that flexes to provide a variable capacity chamber thus accommodating volume changes in the motor oil. Generally, a vent through the housing is utilized to allow entry and expulsion of well fluid between the housing interior and the well bore as required by the expansion and contraction of the elastomeric bladder.

The other common type of motor protector is normally referred to as a "labyrinth" type protector. The labyrinth design uses a series of cavities and vertical labyrinth paths to keep the well fluid and the motor fluid separated. The two fluids are in direct contact; therefore, the effectiveness of the device depends on the difference in specific gravity and the immiscibility between the well fluid and the motor fluid. The design allows for expansion and contraction of the motor fluid by providing a vent through the housing wherethrough well fluid can enter or be withdrawn from the adjacent cavity in response to changes in motor fluid volume.

The motor protectors are often used in combination. For example, one or more labyrinth-type protectors may be used above or below one or more bladder protectors. Usually, motor fluid in the bladder communicates directly with a passage to the motor. Therefore, a failure of the elastomeric material comprising the bladder creates a short path for well fluid subsequently penetrating the bladder to reach the motor.

The bladder is usually made of a high-temperature, high-performance elastomer that is resistant to the harsh conditions encountered downhole. However, there is still a need to reduce the chemical attack of well fluid contaminants or impurities on the elastomer and thus prolong the operational life of the bladder elastomer itself and ultimately the motor protector and submersible motor assembly.

SUMMARY OF THE INVENTION

The present invention is a motor protector for use in a submersible pumping system disposed in a well. The motor protector comprises a housing having a port therethrough for communicating a housing interior with the well. A reactant is disposed in the housing interior and will contact well fluid that is communicated into the housing interior. The reactant will react with the well fluid communicated into the housing interior. The motor protector may have an expansion chamber in communication with the motor to accommodate the expansion and contraction of the motor fluid in the motor. The expansion chamber may be defined by a barrier in the housing interior separating the well fluid from the motor fluid. Preferably the barrier is a flexible barrier, which may be referred to as a bladder, and more preferably the flexible barrier comprises an elastomer. The reactant may be, for example, but not limited to, a liner, preferably cylindrical, webbing, wool, mesh, and granules. Nonlimiting examples of suitable reactants include metallic copper, metallic zinc, elastomers and polymers.

Because the reactant is located in the housing such that the reactant is in contact with well fluid communicated into the housing, the reactant can react with or trap impurities in the well fluid that are harmful to, for example, the bladder before the impurities can migrate closer to the bladder. There are many impurities in the well fluid that are harmful to materials used in submersible pumping systems generally and to elastomeric bladder material particularly. Such impurities include hydrogen sulfide ($H_2S$), amines, and dipolar gases such as carbon dioxide ($CO_2$). $H_2S$ aggressively corrodes most metal alloys and reacts with elastomeric bladder material to degrade the elastomer, eventually resulting in tearing or similar failure of the material. Amines, often intentionally added to the well fluid as a corrosion inhibitor, react with hydrofluorocarbon elastomers to produce a reactive grafted substitute that replaces the fluorine atoms. As a result, the chemical inertness of the fluoropolymer, and its ability to resist chemical attack, is reduced. In addition, important physical and mechanical properties can suffer. Dipolar gases such as $CO_2$ react similarly.

In one embodiment, the reactant comprises metallic copper and/or zinc. Metallic copper is well known for reacting with impurities such as hydrogen sulfide ($H_2S$) to produce copper sulfide precipitate.

In another embodiment the reactant comprises a polymer or elastomer. Preferably, the elastomer or polymer is one that offers little resistance to amines, dipolar gases and $H_2S$. In this manner, the elastomer or polymer can react with or consume the contaminant before it reaches the elastomer bladder. Reaction with even a portion of the contaminants will help to protect the motor and the bladder separating the motor oil from the well fluid.

The present invention can also be defined as a method for protecting a motor fluid of a motor submersed within a well from a well fluid, the method comprising separating the well fluid from the motor fluid and positioning the reactant in the housing interior so that it will react with and reduce the concentration of harmful contaminants in the well fluid.

The foregoing and other objects, advantages and features of the present invention will become apparent upon reading the following detailed description in conjunction with the accompanying drawings.

DETAILED DESCRIPTION OF THE PREFERRED EMBODIMENTS

Figure 1:
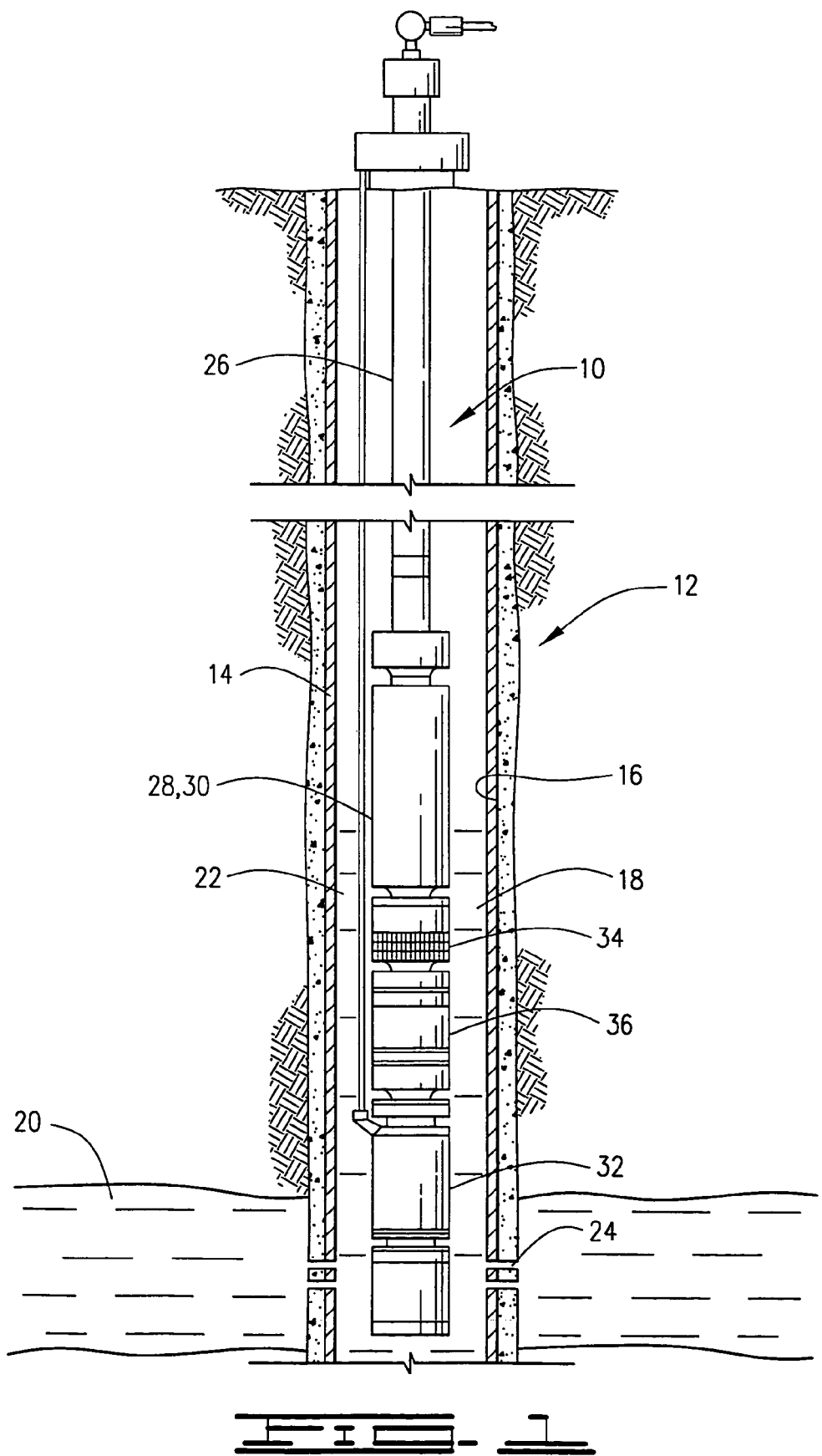
FIG. 1 schematically shows a submersible pump assembly in a well.

Referring now to the drawings, FIG. 1 schematically shows a production string 10 lowered into a well 12. Well 12 typically includes a casing 14 cemented within a well bore 16. An annulus 18 is defined between the casing 14 and the production string 10. Well 12 intersects a subsurface producing formation 20 that may be communicated with the well 12 in any manner known in the art. In the embodiment shown, fluid 22 is produced from subsurface formation 20 and is communicated with the well 12 through perforations 24 in casing 14.

Production string 10 may include production tubing 26 with a submersible pump assembly 28 connected to a lower end thereof. Submersible pump assembly 28 includes electric submersible pump 30 driven by an electric submersible motor 32.

Electric submersible pump assembly 28 further includes an intake 34 connected at a lower end of submersible pump 30. The current invention includes a motor protector 36 which in the embodiment shown is connected between intake 34 and electric submersible motor 32. FIG. 1 shows a typical placement of the motor, which is below the pump; however, it is sometimes desirable to locate the motor above the pump, in which case the motor protector will be positioned below the motor.

Figure 2:
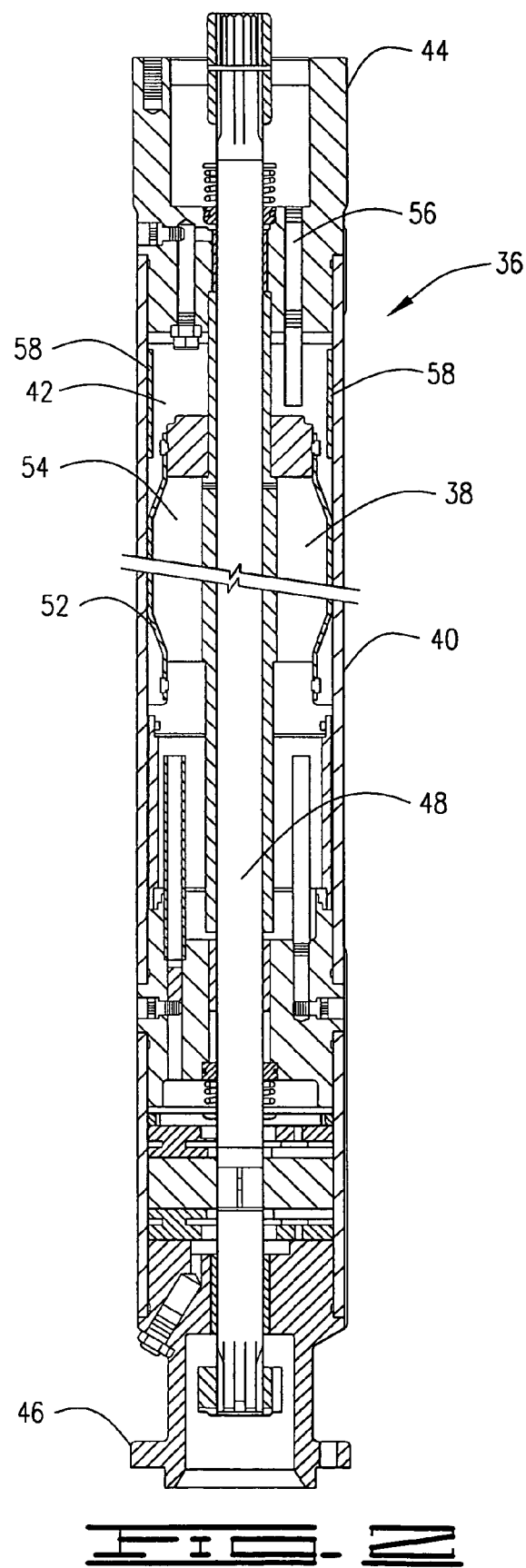
FIG. 2 is a cross section of a motor protector of the current invention.

Referring to the drawings, FIG. 2 shows a cross section of a motor protector for an electric submersible motor wherein the motor protector 36 comprises a bladder-type variable capacity chamber 38, which may be referred to as an expansion chamber. The motor protector comprises a housing 40 defining a housing interior 42. Housing 40 has an upper end 44 adapted to be connected to, for example, an intake 34 and a lower end 46 adapted to be connected to, for example, a submersible motor 32. It is understood and well known in the art that the motor can also be positioned above the pump with motor protectors on either or both sides of the motor, and that the electric submersible pump 30 will be driven by the electric motor 32 with a shaft such as shaft 48. Such submersible motors are filled with motor lubricating oil, which may be referred to as motor fluid.

Expansion chamber 38 comprises a bladder 52 in housing interior 42. Bladder 52 defines a bladder interior 54 which contains motor fluid communicating with the motor. Bladder 52 acts as a barrier separating the motor fluid from the well fluid and is usually made of an elastomer. During operation, as the motor heats causing the motor oil to expand, the motor oil is communicated into bladder interior 54 causing the flexible elastomer bladder 52 to expand. As the motor oil cools and contracts, bladder 52 contracts communicating a portion of the motor fluid back to the motor.

As is known in the art, a fluid passage exists between the interior of motor 32 and the bladder interior 54 and generally will accommodate the expansion and contraction of motor oil and will also allow for the filling of the motor protector 36. To accommodate expansion and contraction of the bladder, well fluid is communicated through port 56 out of and into housing interior 42. The well fluid often contains contaminants that are harmful to the motor and to the elastomer that generally comprises bladder 52. The concentration of these contaminants is reduced by causing at least a portion of the contaminants to contact and react with a reactant such as a cylindrical reactant liner 58. The reactant can be located anywhere within the housing interior where it can contact the well fluid when well fluid is communicated into the housing. In this way the reactant can react with and reduce the concentration of contaminants before they reach, and harm the elastomer bladder and ultimately migrate toward the motor if the bladder degrades or is perforated.

The reactant may also be present as a webbing, wool, mesh or granules. In some forms, such as a webbing, wool or granules, it may be necessary to include a screen or support above and below the reactant to fix the reactant position and keep it from migrating from the desired position.

Contaminants that are particularly troublesome include hydrogen sulfide ($H_2S$), amines, and dipolar gases such as carbon dioxide ($CO_2$). It is well known that $H_2S$ reacts with metals such as copper and zinc to form the respective metal sulfide precipitate. For example, during water treatment, dissolved hydrogen sulfide can be removed from the water by passing the water through granules of metallic copper, zinc or a copper-zinc alloy. Also, in the winemaking process, dissolved hydrogen sulfide is often removed from wine by passing the wine through a metallic copper wire screen or even by inserting several pennies in the wine-processing container. In both examples the dissolved hydrogen sulfide gas reacts with copper to gain electrons (reduction) while metallic copper from the reactant medium loses electrons (oxidation). The reaction product is a black copper sulfide precipitate which is harmless and easily removed from the water or wine. In the present invention, these metals are positioned within the motor protector as a liner, or another form as described above, in order to reduce the concentration of $H_2S$ in the well fluid contacting the elastomer bladder.

The concentration of amines, $CO_2$, and other impurities harmful to the elastomer bladder material can be reduced using a sacrificial elastomer or polymer. Preferably the sacrificial elastomer or polymer is also in a form and location as described above. Although any polymer or elastomer can be used, those that are not recommended for typical use in environments with amines and polar compounds such as $CO_2$ will provide better sacrificial material. Any reduction in the concentration of these impurities will prolong the operating life of the bladder and ultimately the electric motor. Nonlimiting examples of commercial elastomers that can be used to trap amines and polar compounds such as $CO_2$ are nitrile rubber, polyacrylate, ethylene-propylene terpolymers and fluorocarbon elastomers. Preferably a polyacrylate or fluorocarbon elastomer is used.

Figure 3:
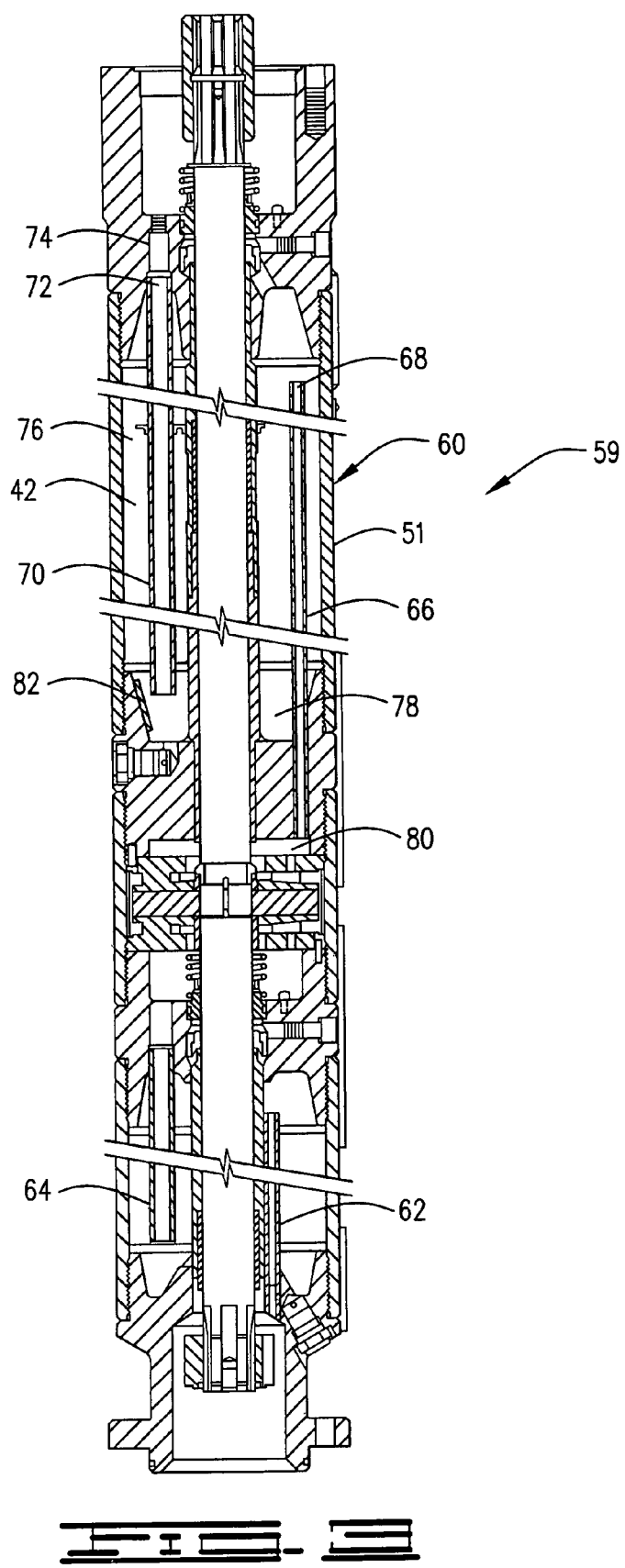
FIG. 3 is a cross section of another embodiment of the current invention.

FIG. 3 shows a cross section of a motor protector 59 comprising a labyrinth-type expansion chamber 60 within a housing 51. During expansion, motor fluid is communicated from the motor into the motor protector through a lower inlet tube 62. The motor fluid will pass upwardly through a flow tube 64, a connecting conduit 66 which has an upper end 68 and a relief conduit 70. Relief conduit 70 is open at upper end 72 and connected to a port 74 in the motor protector.

When the motor fluid expands during operation of the motor, motor fluid from the motor is communicated into lower inlet tube 62 through flow tube 64 and connecting conduit 66 and will be urged outwardly to port 74 through relief conduit 70. When motor fluid contracts, well fluid will be drawn in through port 74 and fluid relief conduit 70.

The housing interior 42 is divided into an upper labyrinth portion 76 and a lower labyrinth portion 78. Because the well fluid will be heavier than the motor fluid in the housing interior, well fluid will settle in the lower labyrinth portion 78. So long as the well fluid level in lower portion 78 remains below the level of the upper end 68 of the connecting conduit 66, well fluid will not pass into a lower motor protector section 80 and potentially contaminate the motor.

However, since the motor fluid and well fluid are in direct contact at the interface, impurities in the well fluid can partition into the motor fluid according to equilibrium conditions. Such equilibrium partitioning is proportional to the concentration of impurities in the respective fluids. Inclusion of a reactant as previously described causes a reduction in the concentration of impurities due to reaction with the reactant. Reduction of the impurity level in the well fluid adjacent the motor fluid causes an equilibrium reduction of the impurity level in the motor fluid, and this results in a prolonging of the operating life of the submersible motor.

The reactant can be located anywhere within the housing interior where the reactant contacts well fluid. Preferably, the reactant is located as a liner 82, or another form, such that the reactant is in contact with well fluid when well fluid is communicated into the housing in, for example, the labyrinth upper portion 76 or the housing interior 42 generally.

It is understood by those skilled in the art that expansion chambers and motor protectors can be modified from those described above and can be used singly or in series in any combination. Also the motor may be positioned above the protectors rather than below as was described. When multiple expansion chambers are used above the motor, the reactant is preferably located within the top expansion chamber since this chamber will generally have a port receiving well fluid; however, designs can vary. Preferably the reactant is positioned in a space within the motor protector that is normally filled with well fluid.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A motor protector for a submersible pumping system disposed in a well, the motor protector comprising:
   a housing having a port therethrough for communicating fluid in the well with a housing interior; and
   a reactant disposed in the housing interior, spaced from any expandable chamber located within the housing interior, for reacting with well fluid communicated into the housing interior, wherein the reactant comprises a lining on the housing interior surface.

2. The motor protector of claim 1 wherein the reactant will react with the well fluid to reduce the harmful effect of contaminants in the well fluid on the housing and housing components.

3. The motor protector of claim 1 wherein the reactant comprises metallic copper.

4. The motor protector of claim 1 wherein the reactant comprises a polymer.

5. The motor protector of claim 1 wherein the reactant comprises an elastomer.

6. The motor protector of claim 1 further comprising an expansion chamber disposed in the housing interior for containing a motor fluid.

7. The motor protector of claim 6, wherein the motor fluid in the expansion chamber is communicated with a motor fluid in a motor in the pumping system, and wherein the expansion chamber accommodates expansion and contraction of the motor fluid.

8. The motor protector of claim 6, the expansion chamber being defined by a bladder disposed in the housing, wherein the reactant reacts in the well fluid to reduce the harmful effect of the contaminants on the bladder.

9. The motor protector of claim 1 wherein the housing interior comprises a labyrinth-type chamber for separately containing the well fluid and a motor fluid.

10. A motor protector for use in a submersible pumping system disposed in a well, the motor protector being in fluid communication with a motor in the submersible pumping system, the motor protector comprising:
    a housing defining a housing interior, the housing having a port for communicating well fluid in the well with the housing interior;
    an expandable chamber in the housing interior for containing a motor fluid and for separating the well fluid from the motor fluid in the housing interior, the expansion chamber being communicated with the motor for accommodating the expansion and contraction of motor fluid in the motor; and
    a reactant comprising a liner disposed in the housing interior, the liner being spaced from the expandable chamber, for reacting with the well fluid to reduce the harmful effect of the well fluid on the expandable chamber.

11. The motor protector of claim 10, wherein the expansion chamber is defined by a flexible barrier in the housing interior.

12. The motor protector of claim 10, wherein the flexible barrier comprises an elastomer.

13. The motor protector of claim 10, wherein the reactant comprises metallic copper.

14. The motor protector of claim 10, wherein the reactant comprises a polymer.

15. The motor protector of claim 10, wherein the reactant comprises an elastomer.

16. A motor protector for use in a submersible pumping assembly in a well comprising:
    an outer housing defining a housing interior, wherein the housing interior has a port for communicating a well fluid in the well with the housing interior, and wherein the housing interior accommodates the expansion and contraction of a motor fluid in a motor connected in the submersible pump assembly;
    a bladder for separating the well fluid and the motor fluid; and
    a reactant comprising a cylindrical liner disposed in the housing interior and spaced from the bladder, for reacting with the well fluid communicated into the housing interior.

17. The motor protector of claim 16, wherein the reactant reacts with the well fluid to reduce the harmful effect of the well fluid on the housing and components disposed in the housing.

18. The motor protector of claim 16, wherein the bladder accommodates the expansion and contraction of the motor fluid.

19. The motor protector of claim 16, wherein the reactant comprises metallic copper.

20. The motor protector of claim 16, wherein the reactant comprises a polymer.

21. The motor protector of claim 16, wherein the reactant comprises an elastomer.

22. A method for protecting a motor fluid of a motor submersed within a well from a well fluid comprising:
    separating the well fluid from the motor fluid in a housing interior defined by a housing of the motor protector, the housing having a port therethrough communicating the housing interior with the well fluid in the well;

placing a reactant comprising a cylindrical liner in the housing interior spaced from any expandable chamber located within the housing interior; and allowing the reactant to react with the well fluid to reduce the harmful effect of contaminants in the well fluid on the motor protector.

23. The method of claim 22, the expandable chamber comprising a flexible elastomer barrier separating the well fluid from the motor fluid.

24. The method of claim 22 wherein the reactant comprises metallic copper.

25. The method of claim 22 wherein the reactant comprises a polymer.

26. The method of claim 22 wherein the reactant comprises an elastomer.

27. A motor protector for a submersible pumping system disposed in a well, the motor protector comprising:

a housing having a port therethrough for communicating fluid in the well with a housing interior; and a polymeric reactant disposed in the housing interior, spaced from any expandable chamber located within the housing interior, for reacting with well fluid communicated into the housing interior.

28. The motor protector of claim 27 wherein the reactant comprises an elastomer.

29. A motor protector for use in a submersible pumping system disposed in a well, the motor protector being in fluid communication with a motor in the submersible pumping system, the motor protector comprising:

a housing defining a housing interior, the housing having a port for communicating well fluid in the well with the housing interior;

an expandable chamber in the housing interior for containing a motor fluid and for separating the well fluid from the motor fluid in the housing interior, the expansion chamber being communicated with the motor for accommodating the expansion and contraction of motor fluid in the motor; and a polymeric reactant disposed in the housing interior, spaced from the expandable chamber, for reacting with the well fluid to reduce the harmful effect of the well fluid on the expandable chamber.

30. The motor protector of claim 29, wherein the reactant comprises an elastomer.

31. A motor protector for use in a submersible pumping assembly in a well comprising:

an outer housing defining a housing interior, wherein the housing interior has a port for communicating a well fluid in the well with the housing interior, and wherein the housing interior accommodates the expansion and contraction of a motor fluid in a motor connected in the submersible pump assembly;

a bladder for separating the well fluid and the motor fluid; and a polymeric reactant disposed in the housing and spaced from the bladder, for reacting with the well fluid communicated into the housing interior.

32. The motor protector of claim 31, wherein the reactant comprises an elastomer.

33. A method for protecting a motor fluid of a motor submersed within a well from a well fluid comprising:

separating the well fluid from the motor fluid in a housing interior defined by a housing of the motor protector, the housing having a port therethrough communicating the housing interior with the well fluid in the well;

placing a polymeric reactant in the housing interior spaced from any expandable chamber located within the housing interior; and allowing the polymeric reactant to react with the well fluid to reduce the harmful effect of contaminants in the well fluid on the motor protector.

34. The method of claim 33 wherein the reactant comprises an elastomer.

* * * * *